Nov. 17, 1964  R. M. ROBERTS  3,157,083
SCRAP CUTTER WITH MATERIAL RESPONSIVE CONTROL MEANS
Filed May 24, 1962  2 Sheets-Sheet 1

INVENTOR.
RUSSELL M. ROBERTS
BY
ATTORNEYS

Nov. 17, 1964   R. M. ROBERTS   3,157,083
SCRAP CUTTER WITH MATERIAL RESPONSIVE CONTROL MEANS
Filed May 24, 1962   2 Sheets-Sheet 2
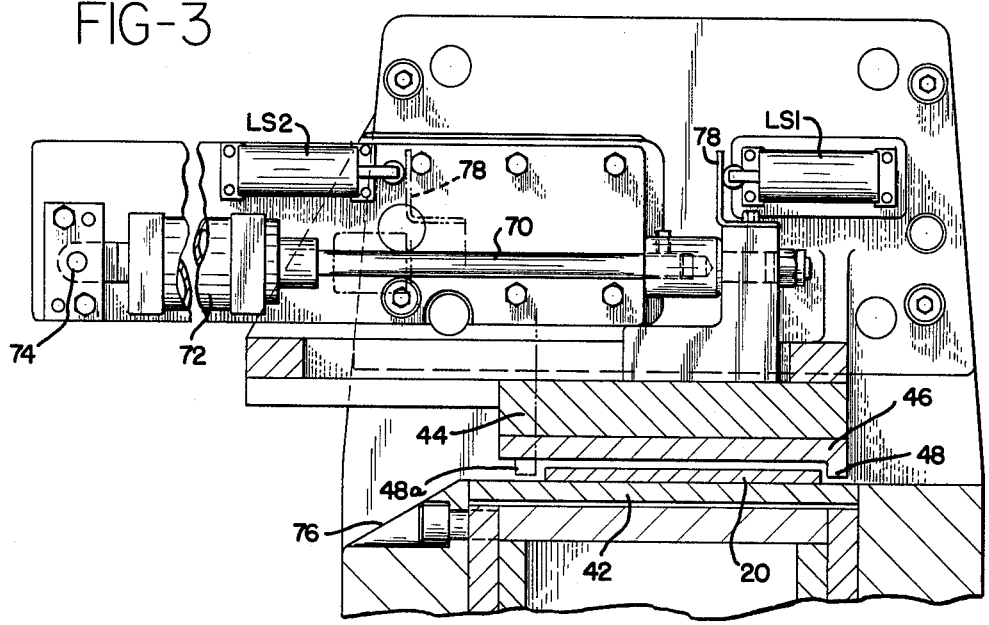
FIG-3
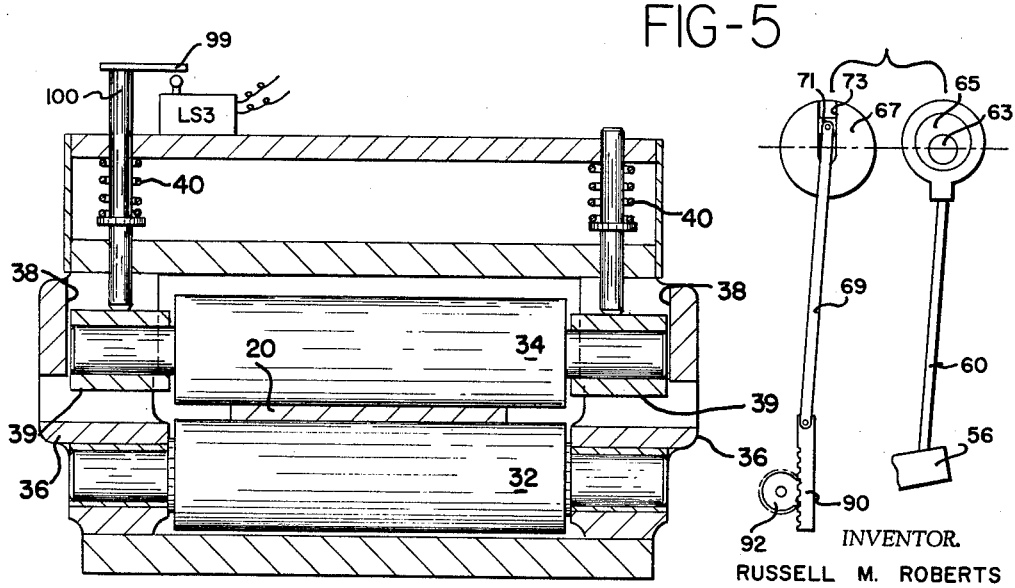
FIG-4
FIG-5
INVENTOR.
RUSSELL M. ROBERTS
BY
ATTORNEYS

United States Patent Office 3,157,083
Patented Nov. 17, 1964

3,157,083
SCRAP CUTTER WITH MATERIAL RESPONSIVE CONTROL MEANS
Russell M. Roberts, Minster, Ohio, assignor to The Minster Machine Co., Minster, Ohio, a corporation of Ohio
Filed May 24, 1962, Ser. No. 197,322
7 Claims. (Cl. 83—80)

This invention relates to press arrangements and is particularly concerned with a scrap cutter for chopping up the scrap as it comes from the press and with the scrap cutter being particularly characterized in that the scrap has no tendency to jam therein.

In connection with presses, particularly blanking presses, that handle strip material, the material is ordinarily fed into the press from one side and passes through the die means in the press and then emerges from the other side of the press as a strip of scrap. The workpieces that are blanked out from the strip usually fall through the bottom of the die means and are collected separately or are conveyed away from the press by some suitable conveyor arrangement.

With reference to the strip of scrap which emerges from the press, it is desirable to chop this up into short lengths as it comes from the press so that it does not create any storage or handling problem and so that the scrap is in such a condition that it can readily be baled or otherwise handled for being conveyed to a place where it will be reprocessed.

Scrap cutters of this general nature are known and are often mounted directly on the press structure and are operated by a connection leading to the rotating crankshaft of the press. The scrap cutter, broadly, comprises a pair of blades forming a shear so that the strip of scrap feeding between the blades will be cut up by the blades into short lengths.

While such devices are quite satisfactory for chopping up the strip of scrap there has always been a particular difficulty in connection with the scrap cutters in that upon reaching the end of one strip of material and commencing on a new strip of material, there is the possibility that the strips will get into the scrap cutter in overlapping relation thus preventing the feeding of the material through the scrap cutter, or damaging the scrap cutter or interfering with the movement of the strip through the press.

This can have such serious consequences that it is usually the case that, in operating the press with a scrap cutter, the operator will, at the end of a strip of material and prior to starting a new strip of material through the press, clear the scrap cutter so that there is no possibility of the two strip ends coming together in the scrap cutter.

This, of course, represents a considerable loss of time from the productive possibilities of the press and also takes up part of the press operator's time which could be spent in productive efforts.

Having the foregoing in mind, it is a particular object of the present invention to provide a scrap cutter arrangement adapted for being associated with a press in which the ends of strips of scrap fed through the scrap cutter are discharged therefrom thereby to prevent the ends of strips of scrap from overlapping in the scrap cutter.

Another object of this invention is the provision of a scrap cutter adapted for association with a press and operated by rotation of the crankshaft of the press which automatically ejects the final end of a strip of scrap fed therethrough.

Still a further object of this invention is the provision of a scrap cutter of the nature referred to which includes means to detect the final end of a strip of scrap being fed therethrough and which is operable for automatically ejecting the said end before it reaches the shearing knives of the scrap cutter.

These and other objects and advantages of this invention will become more apparent upon reference to the following specification taken in connection with the accompanying drawings in which:

FIGURE 3 is a vertical sectional view through the scrap cutter indicated by line 3—3 on FIGURE 2 and showing the arrangement for laterally reciprocating the scrap guide so as to eject the final end of the strip laterally from the scrap cutter;

Figure 2:
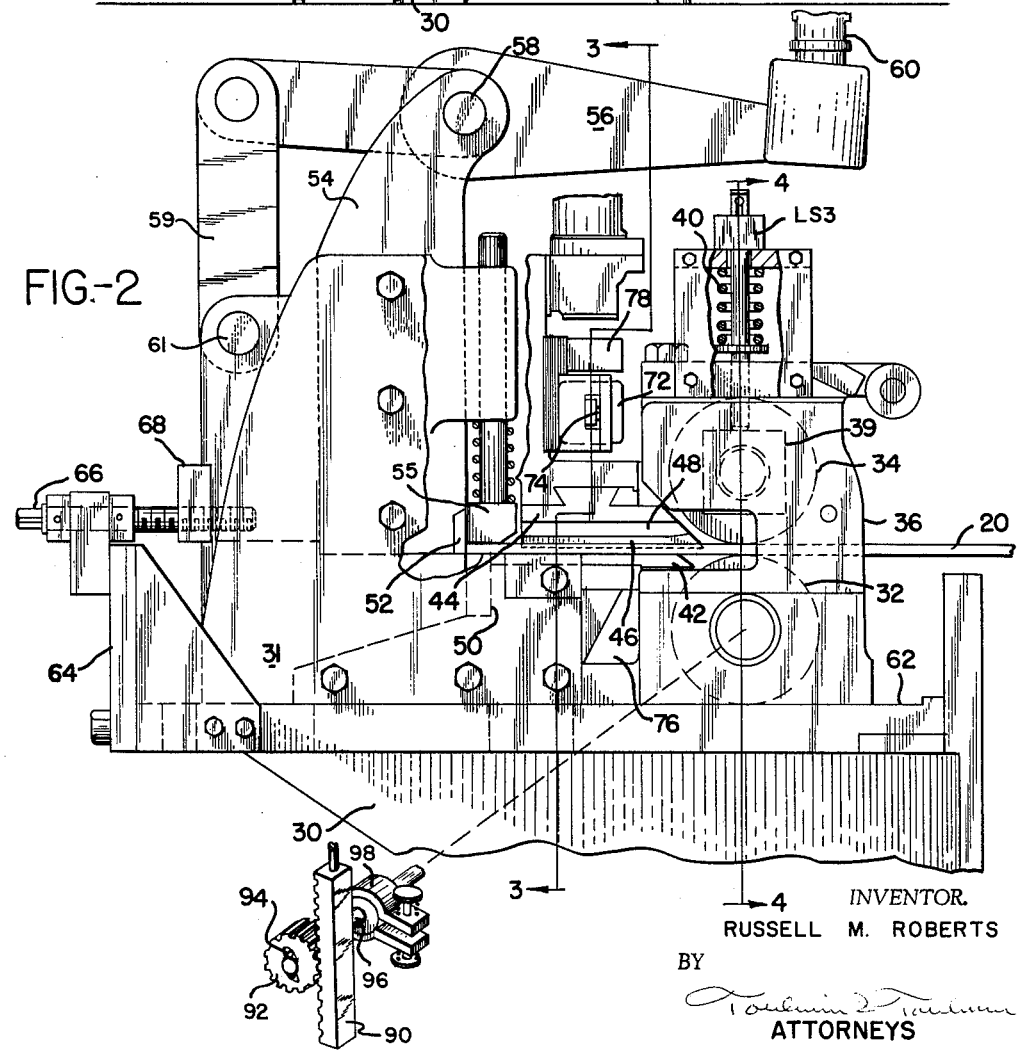
FIGURE 2 is a view of the scrap cutter drawn at somewhat enlarged scale and looking into the side thereof.

FIGURE 4 is a vertical sectional view indicated by line 4—4 on FIGURE 2 showing the arrangement whereby the feed rollers for the strip of scrap are so mounted that the movement of one thereof can be employed for detecting the end of the strip of scrap being fed through the scrap cutter; and FIGURE 5 is a diagrammatic view showing how the feed rollers of the scrap cutter and the shearing knives thereof are actuated.

Figure 1:
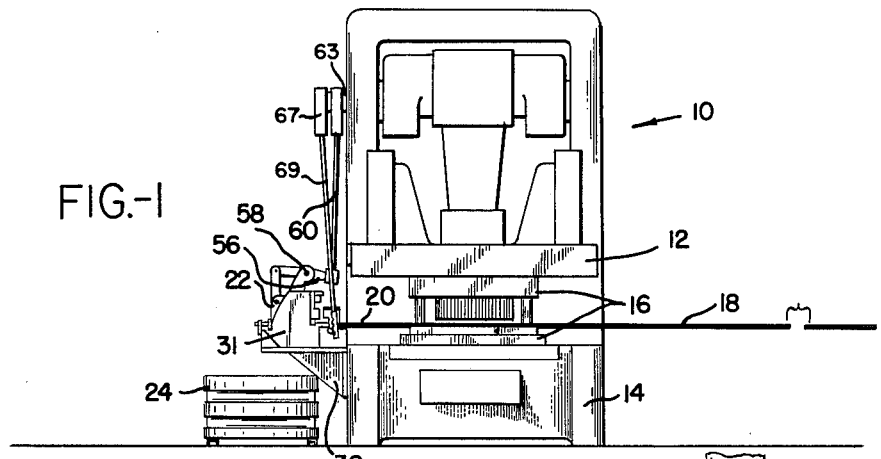
FIGURE 1 is a somewhat diagrammatic view showing a press arrangement with a scrap cutter according to this invention mounted thereon.

Referring to the drawings somewhat more in detail FIGURE 1 shows a press generally designated with reference numeral 10 and showing a platen 12 reciprocable therein. Press 10 also has a bed 14 and mounted on platen 12 and bed 14 are the portions 16 of a die set. A strip of material 18 is fed through the press and is operated therein by the die set 16, which may be a simple blanking die or which may be a multiple station progressive die.

In any case, what remains of strip 18 after the workpieces have been blanked therefrom emerges from the press as a strip of scrap indicated at 20. This scrap is fed into a scrap cutter 22 that cuts the scrap into short lengths and the short lengths are collected in some sort of container 24 and are then baled up or treated in any desired manner.

The scrap cutter will be better seen in FIGURES 2 through 4 where it will be seen that the scrap cutter consists of a base part 30 adapted for being secured to the side of the press. Resting slidably on base 30 is a frame 31 in which the scrap cutter proper is located. Strip 20 is received in the scrap cutter between a lower rotatable feed roll 32 and an upper feed roll 34. Lower roll 32 is rotatable on a fixed axis in the main bearing bracket 36 forming a part of the frame 31 of the scrap cutter.

The other feed roll 34, however, is vertically movable in the main bearing bracket by its sliding arrangement in guide means 38 of the bracket.

The upper roll is resiliently urged toward the lower roll by the biasing spring means 40 and it will be evident that this roll is movable upwardly to permit the strip of scrap to pass between the rolls and that, furthermore, should the end of the scrap pass between rolls, the upper roll will drop downwardly. Also, in the even that two strips 20 of scrap material get in between the rolls in overlapping relation, the roll 34 will be lifted upwardly a substantial distance.

The scrap material being handled will vary from one-sixteenth of an inch upwardly to, say, three-eighths to one-half of an inch in thickness and it will accordingly be evident that the differing conditions that might exist at the feed rolls will produce a substantial amount of movement of the upper roll 34 which can be relied upon for controlling the scrap cutter.

Leftwardly of the rolls 32 and 34, the strip 20 is delivered to a table or the like at 42 and positioned over this table is a slide 44 having a wear plate or guide 42 on the bottom thereof that defines a space through which the strip of scrap material at 20 passes so that the strip is guided by the depending side part 48 of wear plate 46.

After passing through the guide arrangement, the strip of scrap passes between a lower shearing knife 50 that is stationarily mounted in the frame of the scrap cutter, and an upper shearing knife 52 that is mounted on a member 54 that is reciprocable in the vertical direction in the frame of the scrap cutter. Member 54 may also carry a spring loaded hold down 55 that clamps the strip during shearing. Member 54 is pivotally connected at 58 with a lever 56 pivoted at one end to a link 59 that is, in turn, pivoted at 61 in the frame of the scrap cutter. Lever 56 is connected by linkage 60 with an eccentric on the crankshaft of press 10. The arrangement is such that with every stroke of the press platen, there is a shearing action on the strip 20 of the scrap strip by the blades 50 and 52 on account of reciprocation thereof by lever 56.

This shearing can take place on the down stroke or the up stroke of the press platen but preferably takes place on the down stroke so that upon the up stroke of the press platen, the shearing knives 50 and 52 will be spaced apart so that the strip 20 can be fed therebetween.

The aforementioned base 30 of the scrap cutter is fixed to the frame of the press and the upper portion or frame 31 consisting of the main bearing bracket 36 and the operative components of the scrap cutter, is slidable toward and away from the press in the aforementioned base.

This is accomplished by arranging the upper part of the scrap cutter so that it is slidable in guide means 62 carried by the base of the scrap cutter. The base 30 also includes an upstanding bracket part 64 that carries an adjusting screw 66. This adjusting screw engages a bar 68 carried on frame 31 of the scrap cutter whereby adjustment of screw 66 is effective for shifting the operative portion of the scrap cutter toward and away from the press frame.

This permits the shearing blades 50 and 52 to be adjusted relative to the die set in the press frame so that the cutting off of the scrap strip can be accomplished at the best point therealong, for example, at a region where there is the least amount of material for the shearing blades to cut through.

The aforementioned slide 44 has connected thereto a plunger 70 of a double acting fluid motor, either pneumatic or hydraulic, which has a cylinder 72 connected at 74 with the frame of the scrap cutter. As will be seen in FIGURE 3, the said fluid motor can be energized to cause lateral movement of slide 44 thereby to carry guide 46 with it whereby the portion of the scrap strip 20 that is disposed between the lateral side edges 48 and 48A the guide will be moved laterally out of the scrap cutter and slide down the incline 76 and thus be ejected from the scrap cutter.

In this manner the final end portions of the strips of scrap are ejected from the scrap cutter and it is prevented that these ends of the scrap strip will interfere with the movement of the next following strip of scrap through the scrap cutter and also so that the ends of the strips of scrap will not accidentally get into overlapping relation.

FIGURE 3 shows the slide in its normal position and in this position actuator 78 engages a limit switch LS1. When the scrap cutter detects the end of a strip of scrap being fed therethrough it operates the hydraulic motor to move laterally so actuator 78 will leave limit switch LS1 and will move with the slide into position to engage limit switch LS2 whereupon the fluid motor will be automatically reversed and will return the slide to its starting position where it will remain until another final end of a scrap strip is detected by the scrap cutter.

The scrap cutter is operated on the down stroke of the press platen by providing the crank shaft 63 of the press with an eccentric 65 which drives the link 60. This link operates through linkage within the frame of the scrap cutter for reciprocating blade 52 relative to blade 50.

The rolls in the scrap cutter are driven for advancing the strip of scrap therethrough by a similar arrangement, for example, a crank 67 on the end of the crank shaft which operates through a linkage 69 to reciprocate a rack 90 which engages a pinion 92 that is connected by overrunning clutch means 94 with shaft 96 of the lower roll 32. Brake means 98 pertaining to the shaft prevents the rolls from overrunning. Crank 67 is adjustable by adjusting block 71 in slot 73 to vary the feed of the scrap strip.

The overrunning clutch arrangement, of course, permits return movement of the drive rack without rotation of the shaft 96.

Initiation of the lateral movement of the guide to eject the end of the scrap strip from the scrap cutter may be accomplished by a limit switch LS3 arranged for being actuated by a plate 99 on plunger 100 that is operatively associated with bearing block 39 pertaining to upper feed roll 34, said bearing block being vertically slidable in the guide means 38 of the main bearing bracket 36.

The operation of the scrap cutter, so far as the cutting up of the strip of scrap is concerned, is integrated with the operation of the press by mechanical connections therebetween represented by link 60 and its drive eccentric, and by the rack 90 and its drive linkage and crank. When the scrap cutter operates to eject the end of a strip of scrap, this can be integrated with the operation of the press by preventing a cycling of the press through interlocks in the press control circuit including a blade or blades of one or more of the limit switches LS1, LS2 or LS3 pertaining to the scrap cutter.

In this manner the operation of the scrap cutter, including the ejection of the end of the strip of scrap can be made fully automatic so that the press operator need only supply material to be operated to the press and it is not required to take time to clear the scrap cutter or to do any more than check the operation thereof. Accordingly, the press operator does not lose time on account of the scrap cutter and his time as well as the press time, can be completely devoted to production.

It will be evident that switches LS1 and LS2 can be employed to prevent the press from operating during the ejecting and return movement of the stroke guide by having blades thereof in the control circuit of the press.

It will be understood that this invention is susceptible to modification in order to adapt it to different usages and conditions; and, accordingly, it is desired to comprehend such modifications within the scope of the appended claims.

I claim:

1. A scrap cutter for use with a press or the like comprising; a frame, shearing blades in the frame, feed rollers in the frame spaced from the shearing blades for feeding a strip of material to be cut toward said blades, said frame including a table portion over which the strip slides as it is fed from said feed rollers to said shearing blades, a stock guide over the table engaging at least one side edge of the strip, at least one of said rollers being resiliently biased toward the other thereof whereby when the end of a strip passes from between said rollers the rollers will move toward each other, and means operable automatically in response to movement of said rollers toward each other for moving said stock guide laterally to eject the strip end from the cutter.

2. A scrap cutter for use with a press or the like comprising; a frame, shearing blades in the frame, feed rollers in the frame spaced from the shearing blades for feeding a strip of material to be cut toward said blades, said frame including a table portion over which the strip slides as it is fed from said feed rollers to said shearing blades, a stock guide over the table engaging at least one side edge of the strip, means supporting said stock guide in said frame for lateral movement therein, a motor connected between the frame and the stock guide for moving the stock guide in the frame, one of said rollers being rotatable on a fixed axis in the frame and the other being movable in the frame toward and away from said one roller and being resiliently biased toward said one roller, and control means responsive to movement of said other roller toward said one roller when the end of a strip passes from between said rollers for energizing said motor to move said stock guide in the frame to eject the strip end from the cutter.

3. A scrap cutter for use with a press or the like comprising; a frame, shearing blades in the frame, feed rollers in the frame spaced from the shearing blades for feeding a strip of material to be cut toward said blades, said frame including a table portion over which the strip slides at it is fed from said feed rollers to the shearing blades, a stock guide over the table engaging at least one side edge of the strip means supporting said stock guide in said frame for lateral movement therein, a motor connected between the frame and the stock guide for moving the stock guide in the frame, one of said rollers being rotatable on a fixed axis in the frame and the other being movable in the frame toward and away from said one roller and being resiliently biased toward said one roller, and control means responsive to movement of said other roller toward said one roller when the end of a strip passes from between said rollers for energizing said motor to move said stock guide in the frame to eject the strip end from the cutter, said control means also being operable for returning the stock guide to its original position following said ejection.

4. A scrap cutter for use with a press or the like comprising; a frame, shearing blades in the frame, feed rollers in the frame spaced from the shearing blades for feeding a strip of material to be cut toward said blades, said frame including a table portion over which the strip slides as it is fed from said feed rollers to said shearing blades, a stock guide over the table engaging at least one side edge of the strip means supporting said stock guide in said frame for lateral movement therein, a motor connected between the frame and the stock guide for moving the stock guide in the frame, one of said rollers being rotatable on a fixed axis in the frame and the other being movable in the frame toward and away from said one roller and being resiliently biased toward said one roller, and control means responsive to movement of said other roller toward said one roller when the end of a strip passes from between said rollers for energizing said motor to move said stock guide in the frame to eject the strip end from the cutter, said control means also being operable for returning the stock guide to its original position following said ejection and for preventing operation of a press associated therewith during said ejection and said return.

5. The scrap cutter as claimed in claim 4 further comprising; scrap cutter adjusting means for shifting said shearing blades in said frame to cut through the scrap at the area of least resistance to said blades.

6. A scrap cutter for use with a press or the like comprising; a frame, shearing blades in the frame, feed rollers in the frame for feeding the scrap between the feed in rollers and the shearing blades, a stock guide between the feed rollers and the shearing blades, motor means to move said stock guide laterally, and control means on said feed rollers responsive to the thickness of scrap passing between said rollers to actuate said motor means and thereby expel short lengths of scrap from said cutter.

7. The scrap cutter as claimed in claim 6 further comprising scrap cutter adjusting means for shifting said shearing blades in said frame to cut through the scrap at the area of least resistance to said blades.

References Cited in the file of this patent

UNITED STATES PATENTS

| | | |
|---|---|---|
| 947,360 | Wallenthin | Jan. 25, 1910 |
| 1,016,547 | Cahill | Feb. 6, 1912 |
| 1,641,678 | Hodge | Sept. 6, 1927 |
| 1,883,996 | Leland | Oct. 25, 1932 |
| 2,268,052 | Miller | Dec. 30, 1941 |
| 2,270,720 | Thompson | Jan. 20, 1942 |

FOREIGN PATENTS

| | | |
|---|---|---|
| 786,681 | Great Britain | Nov. 29, 1957 |